United States Patent [19]

Barker et al.

[11] 3,920,857

[45] Nov. 18, 1975

[54] METHOD OF PREPARING A GRANULAR FREE-FLOWING LECITHIN PRODUCT

[75] Inventors: Thomas G. Barker, Des Plaines; Larry L. Young, Roselle; Joseph G. Endres, Downers Grove, all of Ill.

[73] Assignee: Central Soya Company, Inc., Fort Wayne, Ind.

[22] Filed: Oct. 21, 1974

[21] Appl. No.: 516,608

[52] U.S. Cl. ............... 426/307; 426/285; 426/588; 426/662; 426/583
[51] Int. Cl.² .......................................... A23C 9/00
[58] Field of Search ........... 426/185, 187, 216, 285, 426/356, 358, 307

[56] References Cited
UNITED STATES PATENTS 3,238,045   3/1966   Damisch, Jr. et al. ............... 426/285

*Primary Examiner*—Hyman Lord
*Attorney, Agent, or Firm*—Dawson, Tilton, Fallon & Lungmus

[57] ABSTRACT

A method of preparing a free-flowing lecithin wherein agglomerated non-fat dry milk or whey is blended with the lecithin.

1 Claim, No Drawings

METHOD OF PREPARING A GRANULAR FREE-FLOWING LECITHIN PRODUCT

BACKGROUND AND SUMMARY OF INVENTION

Although free-flowing lecithin is known to the art, it is achievable only with expensive processing. Normally, a free-flowing lecithin will be virtually 100% lecithin, with possibly a small mount of tricalcium phosphate added as a flowing aid. By "lecithin" we refer to a phosphatide available from vegetable sources, such as soy beans. In the past, extraordinary measures have been taken to develop the necessary flowability such as refinement to remove the associated oil and spray drying from a colloidal state.

We have discovered that advantageous flowability, i.e., the capacity to move by flow that characterizes fluids and loose particulate solids such as granulated sugar, can be achieved through the blending of lecithin with certain dairy products, specifically, agglomerated non-fat dry milk or agglomerated whey.

Further, we have discovered that to achieve the advantageous flowability, the carrier agglomerate must be of a certain particle size, i.e., smaller than 10 mesh and larger than 100 mesh, that the blending must be carried out with the lecithin in a flowable condition. This is usually achieved by heating the lecithin to a moderate temperature, i.e., under about 130°F., and still further, we have discovered that the blending time must be relatively short, i.e., less than about one minute.

Further details, advantages and objectives of the invention can be seen in the following examples:

EXAMPLE 1

In this example a commercial product was prepared which contained 40% lecithin and 60% non-fat dry milk (hereinafter "NFDM"). First, we heated to 110°F. 40 lbs. of commercial lecithin (consisting of approximately two-thirds lecithin and one-third oil). While the heating occurred, 60 lbs. of agglomerated NFDM was added to a ribbon blender and the blender started. Thereafter, the heated lecithin was added quickly (in a period of about 5 to 10 seconds), but under conditions that uniform distribution was maintained. Thereafter, the blended materials were removed from the blender and packaged in a polyethylene-line fiberboard drum. Testing of the flow characteristics of the material indicated that it had the same flowability as a lecithin made according to the extraordinary procedure of spray drying from a colloidal state after oil removal. However, even with the addition of the blending cost, the cost to achieve the blended lecithin product was roughly one-third that of the lecithin prepared by the extraordinary procedure just referred to.

One procedure to achieve the agglomerated NFDM was to pasteurize skim milk by holding the same at 15 seconds at 160°-165°F., and then condensing the same to approximately 45% total solids. This is then spray-dried, using an air outlet temperature under about 185°F. The dry material is cooled to less than 100°F. as rapidly as possible, and is sifted through a 25-mesh screen to remove lumps. The powder is placed in a chamber equipped with steam or water inlets to raise the moisture content of the powder to the point of tackiness. Turbulent air (or mechanical means) is used in the aggregator to compact the particles to relatively large clumps. The material is removed and redried to about 3.5–4% moisture, utilizing heated air. The agglomerates are crushed to the desired size through breaking rolls, and then screened to remove fines. Such materials are commercially available in package form, and we have found that the size of the agglomerate is important in the successful practice of the invention. The particle size distribution was that seen in Column A of the table below:

| Screen | A | B |
| --- | --- | --- |
| Retained on 10 | — | 8 |
| Retained on 20 | 20 | 40 |
| Retained on 30 | 20 | 8 |
| Passed on 30 | 60 | 44 |

On the other hand the particle size distribution of column B did not produce an acceptable product.

EXAMPLE 2

The procedure of Example 1 was followed, but substituting sweet dairy whey in place of the NFDM. To agglomerate the whey, the same procedure as described above relative to the NFDM was employed, i.e., moisture added to create tackiness, clumping, drying, crushing, and screening. To prepare the whey for the agglomerating, a conventional procedure is to preheat the whey to 170°–220°F. for entry into a multiple-effect evaporator where moisture is removed until the solids are 40–70%. A commonly employed drying method is to cool the whey concentrate to 35°–80°F., feed and crystallize the lactose by holding 24 hours, and then spray-drying the concentrate. As with the case of NFDM, particle size is significant. Particles larger than 10 mesh give a granular product, but one which is very tacky, wet, and does not absorb the lecithin readily. Particles smaller than 100 mesh form a peanut butter-like paste.

EXAMPLE 3

To provide a somewhat higher lecithin content product, i.e., about 50%, the procedure of Example 1 was modified slightly. First, the heated lecithin was added to the blender, after which the agglomerated NFDM in one instance (the agglomerated whey in another instance), was added on top; thereafter the blending was continued for 30 seconds. This resulted in a product having suitable flowability, i.e., that approximating granulated sugar.

EXAMPLE 4

An alternative procedure was followed for producing the 50/50 product of Example 3. This employed the addition of two-thirds of the agglomerated NFDM in one instance (whey in another instance) to the blender, followed by addition of the lecithin. Thereafter, the blender was started for 10 seconds, and the other one-third of the agglomerated material was added and the mixture allowed to mix for an additional 20 seconds. This resulted again in a product characterized by suitable flowability.

EXAMPLE 5

A lower concentration lecithin product, i.e., 30% was produced according to the procedure of Example 1, with the agglomerate being added first, and again the product had the desired flowability.

Numerous other dry materials for coating were tested with particle sizes ranging from a very fine powder (wheat flour, hydrolyzed cereal solids, spraydried whey) to small granular material (sugar, cornmeal, wheat germ, textured soy protein fines), to small pieces or chunks (textured soy protein). Much to our surprise, only two types of material could be used successfully. These were the above-tested materials agglomerated NFDM and agglomerated whey. More particularly, we observed that only certain types of agglomerated NFDM and whey yielded the desired results. Particles larger than 10 mesh yield a tacky, wet, nonabsorbtive product, while those smaller than 100 mesh are equally undersirable, as indicated.

We have found a suitable particle size to be such that at least 10% but less than 40% is retained on a No. 20 mesh screen and that a suitable carrier concentration is about 50% to about 70% of the resultant product.

Another factor which influences the flowability of the final product is the flowability of the lecithin at the beginning of the procedure. Some heating of the lecithin may be advantageous for handling purposes. Generally, temperatures above 100°F. are adequate to facilitate handling. Experience thus far indicates that a temperature above 140° results in a wet, undesirable product. Thus, temperatures in the range of 100°–130°F. are preferred. A temperature of 110°F. seems to be optimum. However, satisfactory results have been achieved with lecithin in the range of 75°–80°F.

Another factor is the blending time. Blending times longer than about one minute do not create a better product, but instead, a wetter product, and with additional blending, eventually a paste is produced. Optimally, times less than about 30 seconds are advantageously employed.

The materials produced according to the invention may produce the natural flavor of the carrier/lecithin, or they may be flavored with other materials such as dry powders, liquids, and simulated nut pieces.

We claim:

1. In a process for preparing a granular, free flowing lecithin product, the steps of providing lecithin in a flowable condition by heating the same to a temperature in the range of abut 100°F. to about 130°F. and blending the same within about one minute following the heating step with a carrier selected from the class consisting of agglomerated non-fat dry milk and agglomerated whey having a particle size in the range of about 10–100 mesh, the carrier particle size being such that at least 10% but not less than 40% is retained on a No. 20 mesh screen, the percentage of said carrier in said product being from about 50% to about 70%.

* * * * *